(12) United States Patent
Uematsu et al.

(10) Patent No.: US 10,626,475 B2
(45) Date of Patent: Apr. 21, 2020

(54) HEAT TREATMENT APPARATUS, HEAT TREATMENT METHOD FOR STEEL WORKPIECE, AND HOT BENDING METHOD FOR STEEL WORKPIECE

(71) Applicant: NIPPON STEEL & SUMITOMO METAL CORPORATION, Tokyo (JP)

(72) Inventors: Kazuo Uematsu, Tokyo (JP); Akihiro Sakamoto, Tokyo (JP); Hiroaki Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/089,236

(22) PCT Filed: Mar. 28, 2017

(86) PCT No.: PCT/JP2017/012759
§ 371 (c)(1),
(2) Date: Sep. 27, 2018

(87) PCT Pub. No.: WO2017/170608
PCT Pub. Date: Oct. 5, 2017

(65) Prior Publication Data
US 2019/0085424 A1    Mar. 21, 2019

(30) Foreign Application Priority Data

Mar. 31, 2016   (JP) .................................. 2016-070015

(51) Int. Cl.
*C21D 9/08*      (2006.01)
*C21D 1/74*      (2006.01)
(Continued)

(52) U.S. Cl.
CPC .............. *C21D 9/085* (2013.01); *B21D 7/162* (2013.01); *B21D 7/165* (2013.01); *C21D 1/10* (2013.01);
(Continued)

(58) Field of Classification Search
CPC .......... B21D 7/16; B21D 7/162; B21D 7/165; C21D 1/10; C21D 1/18; C21D 1/42; C21D 1/74; C21D 9/08; C21D 9/085
(Continued)

(56) References Cited

U.S. PATENT DOCUMENTS 4,581,512 A * 4/1986 McGinn .................... C21D 1/62
165/104.13
5,792,258 A * 8/1998 Kimura .................... C30B 13/20
117/222
(Continued)

FOREIGN PATENT DOCUMENTS

DE  10 2013 012 936 A1   2/2015
EP       0 862 965 A1     9/1998
(Continued)

OTHER PUBLICATIONS

Hitoshi et al., Apparatus and method for reforming non-oxidation hardening of long workpiece, Feb. 28, 2002, Abstract, 7 pages (Year: 2002).*
(Continued)

*Primary Examiner* — Scott R Kastler
*Assistant Examiner* — Michael Aboagye
(74) *Attorney, Agent, or Firm* — Birch, Stewart, Kolasch & Birch, LLP

(57) ABSTRACT

A heat treatment apparatus of one aspect of the present disclosure includes: a feed device that feeds a heat treatment workpiece downstream in a feed direction along a heat treatment workpiece pass-line; a heating device that includes
(Continued)

a heating coil disposed downstream of the feed device in the feed direction and encircling the pass-line; a cooling device that is disposed adjacent to the heating coil, downstream of the heating coil in the feed direction, and encircling the pass-line; and a gas supply device that is disposed upstream of the heating coil in the feed direction, directly connected to the heating coil and encircling the pass-line, and that includes a plurality of gas compartments configured by internally partitioning the gas supply device in the feed direction.

11 Claims, 6 Drawing Sheets

(51) Int. Cl.
  *C21D 1/42* (2006.01)
  *C21D 1/18* (2006.01)
  *B21D 7/16* (2006.01)
  *C21D 1/10* (2006.01)
(52) U.S. Cl.
  CPC ............... *C21D 1/18* (2013.01); *C21D 1/42* (2013.01); *C21D 1/74* (2013.01); *C21D 9/08* (2013.01); *B21D 7/16* (2013.01)
(58) Field of Classification Search
  USPC .......... 148/654, 639, 662; 266/46, 149, 250, 266/251, 252, 102, 103, 176, 124, 128; 219/672
  See application file for complete search history.

(56) References Cited

U.S. PATENT DOCUMENTS

| | | | | |
|---|---|---|---|---|
| 6,083,329 | A * | 7/2000 | Tsuchiya | B23K 20/00 148/526 |
| 2008/0066517 | A1 | 3/2008 | Tomizawa et al. | |
| 2012/0167651 | A1 | 7/2012 | Tomizawa et al. | |
| 2012/0175029 | A1 | 7/2012 | Tomizawa et al. | |
| 2012/0325806 | A1 * | 12/2012 | Okada | C21D 1/42 219/672 |

FOREIGN PATENT DOCUMENTS

| | | | | |
|---|---|---|---|---|
| GB | 2 128 207 | A | 4/1984 | |
| JP | 50-101207 | | 8/1975 | |
| JP | 11-21619 | A | 1/1999 | |
| JP | 11-269551 | A | 10/1999 | |
| JP | 2001-64729 | A | 3/2001 | |
| JP | 2002-3933 | A | 1/2002 | |
| JP | 2002060833 | * | 2/2002 | ............ C21D 9/085 |
| JP | 2011-89150 | A | 5/2011 | |
| JP | 2011089150 | * | 5/2011 | ............ C21D 9/085 |
| JP | 2012-197488 | A | 10/2012 | |
| RU | 209500 | A | 1/1968 | |
| RU | 1222686 | A | 4/1986 | |
| SU | 1222686 | A | 4/1986 | |
| WO | WO 2006/093006 | A1 | 9/2006 | |
| WO | WO 2010/050460 | A1 | 5/2010 | |
| WO | WO 2011/007810 | A1 | 1/2011 | |

OTHER PUBLICATIONS

Kazuhito et al., Method and apparatus for manufacturing hardened steel, May 6, 2011, abstract, claims and 7 pages (Year: 2011).*
Extended European Search Report dated Nov. 29, 2018, in European Patent Application No. 17775145.0.
Decision to Grant a Patent for JP 2017-541897 dated Feb. 20, 2018.
International Search Report for PCT/JP2017/012759 dated Jul. 4, 2017.
Notice of Reason for Rejection for JP 2017-541897 dated Oct. 17, 2017.
Written Opinion of the International Searching Authority for PCT/JP2017/012759 (PCT/ISA/237) dated Jul. 4, 2017.
English Translation of the Written Opinion of the International Searching Authority for PCT/JP2017/012759 (PCT/ISA/237) dated Jul. 4, 2017.
Russian Office Action for corresponding Russian Application No. 2018137482, dated Jun. 21, 2019, with English translation.

* cited by examiner

HEAT TREATMENT APPARATUS, HEAT TREATMENT METHOD FOR STEEL WORKPIECE, AND HOT BENDING METHOD FOR STEEL WORKPIECE

TECHNICAL FIELD

The present disclosure relates to a heat treatment apparatus, a heat treatment method for a steel workpiece, and a hot bending method for a steel workpiece.

BACKGROUND ART

3-Dimensional Hot Bending and Quench (3DQ) technology is known for bending a steel tube into a desired shape and quenching a desired location to increase the strength of the steel tube. Such technology is disclosed in the pamphlets of International Publication (WO) Nos. 2006/093006, 2010/050460, and 2011/007810.

SUMMARY OF INVENTION

Technical Problem

Japanese Patent Application Laid-Open (JP-A) No. 2011-089150 discloses technology in which, in order to suppress oxide scale on the surface of a steel workpiece, an inert gas or a reduced gas (referred to hereafter as "gas") is blown around a steel workpiece that has been heated to a high temperature using a heating coil of a 3DQ device. In this technology, gas is blown toward the steel workpiece upstream of the heating coil in a steel feed direction such that the gas cloaks the periphery of the steel workpiece. However, some of the gas cloaking the periphery of the steel workpiece is liable to disperse away from the steel workpiece before reaching the heating coil. There is thus room for improvement in technology to suppress oxide scale on the surface of a steel workpiece.

In consideration of the above circumstances, an object of the present disclosure is to provide a heat treatment apparatus, a heat treatment method for a steel workpiece, and a hot bending method for a steel workpiece by which oxide formation on the surface of a heat treatment workpiece during heat treatment is able to be suppressed.

Solution to Problem

A heat treatment apparatus of one aspect of the present disclosure includes: a feed device that feeds a heat treatment workpiece downstream in a feed direction along a heat treatment workpiece pass-line (path); a heating device that includes a heating coil disposed downstream of the feed device in the feed direction and encircling the pass-line; a cooling device that is disposed adjacent to the heating coil, downstream of the heating coil in the feed direction, and encircling the pass-line; and a gas supply device that is disposed upstream of the heating coil in the feed direction, directly connected to the heating coil and encircling the pass-line, and that includes a plurality of gas compartments configured by internally partitioning the gas supply device in the feed direction.

A heat treatment apparatus of another aspect of the present disclosure includes: a feed device that feeds a heat treatment workpiece downstream in a feed direction along a heat treatment workpiece pass-line; a heating device that includes a two-turn heating coil disposed downstream of the feed device in the feed direction, encircling the pass-line, with a filler disposed between neighboring portions of the heating coil in the feed direction such that there are no gaps between the neighboring portions; a cooling device that is disposed adjacent to the heating coil, downstream of the heating coil in the feed direction, and encircling the pass-line; and a gas supply device that is disposed upstream of the heating coil in the feed direction, directly connected to the heating coil and encircling the pass-line.

Advantageous Effects of Invention

According to the above aspects, the present disclosure is capable of providing a heat treatment apparatus a heat treatment method for a steel workpiece, and a hot bending method for a steel workpiece by which oxide formation (oxide scale) on the surface of a heat treatment workpiece (such as a steel workpiece) when heat treating the heat treatment workpiece is able to be suppressed.

DESCRIPTION OF EMBODIMENTS

Explanation follows regarding a heat treatment apparatus and a heat treatment method for a steel workpiece of a first exemplary embodiment of the present disclosure, with reference to FIG. 1 to FIG. 5.

Figure 2:
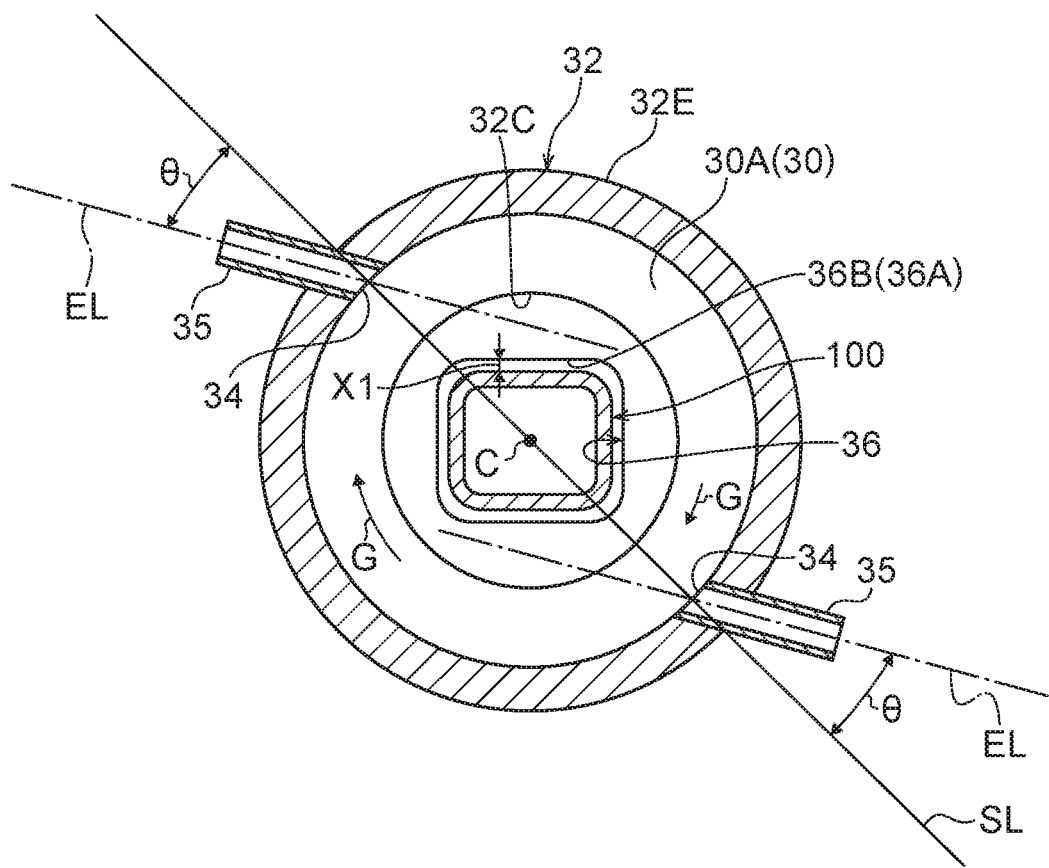
FIG. 2 is a cross-section taken along line 2-2 in FIG. 1.
Figure 3:
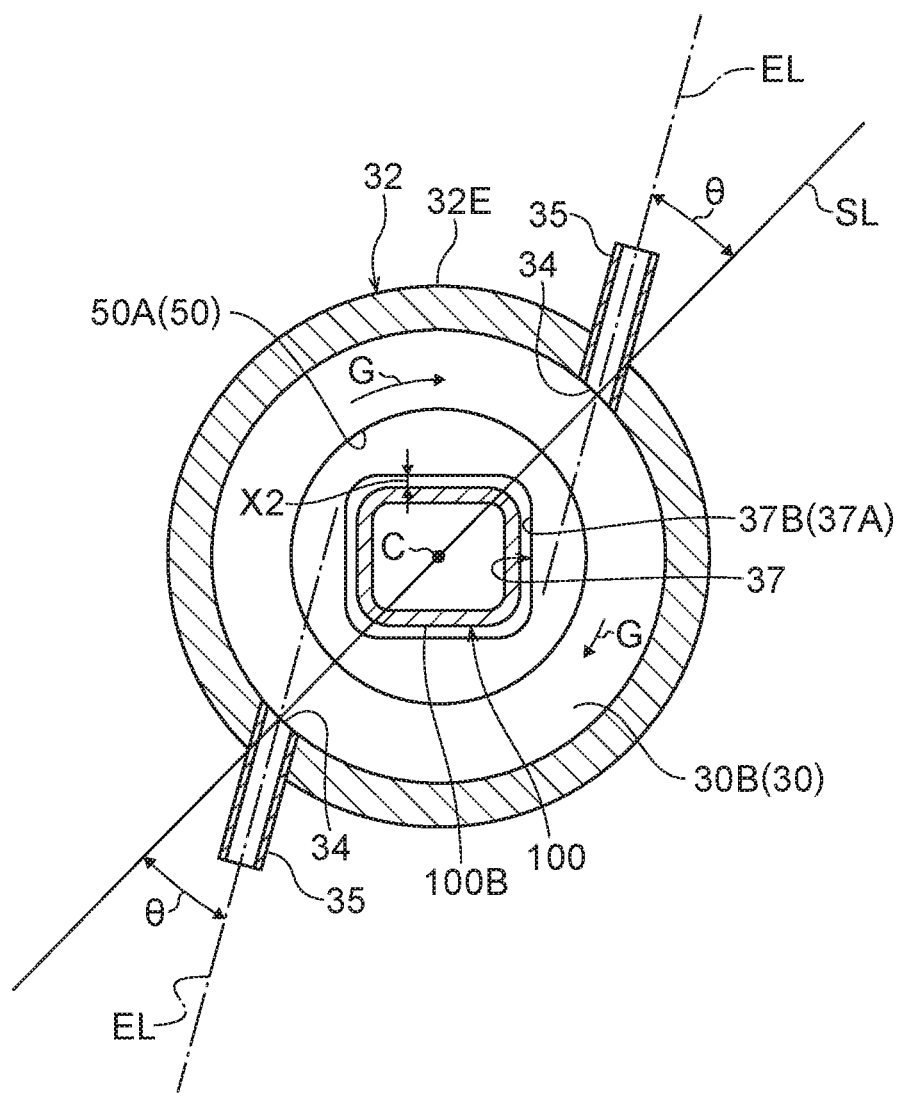
FIG. 3 is a cross-section taken along line 3-3 in FIG. 1.

The following explanation employs an example in which a steel workpiece 100, serving as an example of a heat treatment workpiece of the present disclosure, is configured by a steel tube with a rectangular lateral cross-section profile, as illustrated in FIG. 2 and FIG. 3. The present disclosure is not limited thereto. The steel workpiece 100 of the present disclosure may be a hollow member with a closed lateral cross-section profile, or may be a non-hollow member (for example a solid member).

The steel workpiece 100 may have any lateral cross-section profile. For example, the lateral cross-section profile of the steel workpiece 100 may be circular, rectangular, square, polygonal, substantially rectangular with recessed beads in its sides (a recessed shape with a bead along one face, an H-shape with beads along two opposing faces, or a shape with beads along all faces), or an irregular polygon with a different angle at each vertex (for example a quadrilateral with angles of 87°, 88°, 91°, and 94° at its respective vertices).

Heat Treatment Apparatus 20

Figure 1:
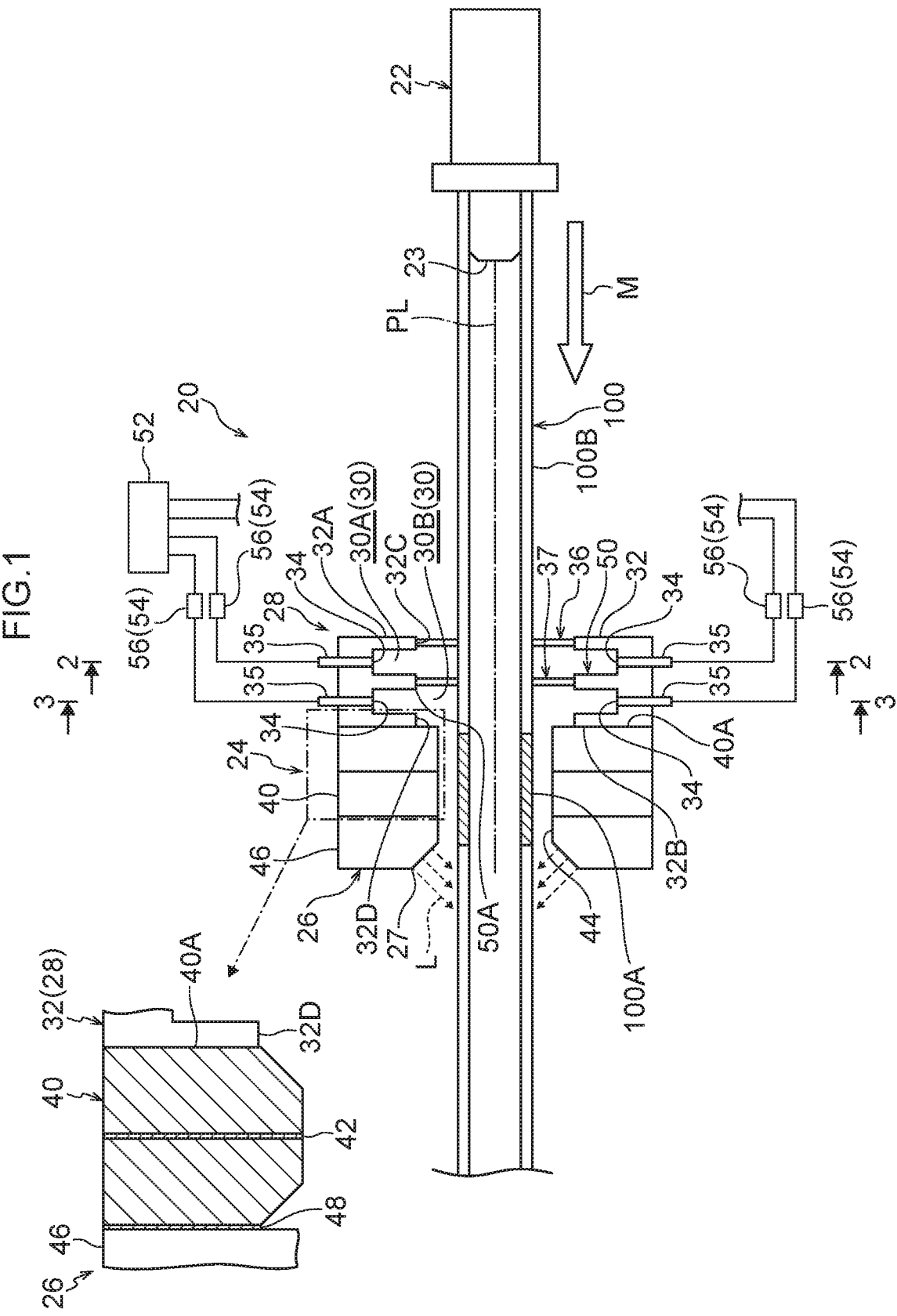
FIG. 1 is a partially enlarged schematic explanatory diagram illustrating relevant portions of a heat treatment apparatus of a first exemplary embodiment of the present disclosure.

As illustrated in FIG. 1, a heat treatment apparatus 20 of the present exemplary embodiment includes a feed device 22, a heating device 24, a cooling device 26, and a gas supply device 28.

Feed Device 22

As illustrated in FIG. 1, the feed device 22 is a device to feed the steel workpiece 100 downstream in a feed direction along a pass-line PL of the steel workpiece 100. Note that in FIG. 1, the feed direction of the steel workpiece 100 (referred to hereafter as the "steel workpiece feed direction" as appropriate) is indicated by the hollow arrow M.

The feed device 22 of the present exemplary embodiment includes a chuck 23 that holds the steel workpiece 100, and a robot, not illustrated in the drawings, that moves the chuck 23 in the steel workpiece feed direction. In the feed device 22, the chuck 23 holds a rear end of the steel workpiece 100, and in this state, the robot moves the chuck 23 in the steel workpiece feed direction. The steel workpiece 100 is thus moved from an upstream side toward a downstream side in the steel workpiece feed direction.

Note that in the present exemplary embodiment, the feed device 22 is configured including the chuck 23 and the robot. However, the feed device 22 of the present disclosure is not limited to such configuration. For example, the feed device 22 may be configured including a ball screw and a drive source serving as a motor to feed the steel workpiece 100 downstream in the steel workpiece feed direction. The feed device of the present disclosure may also employ a known feed device for a steel workpiece, so long as it capable of feeding the steel workpiece 100 downstream in the feed direction.

Heating Device 24

As illustrated in FIG. 1, the heating device 24 is disposed on the pass-line PL so as to be downstream of the feed device 22 in the steel workpiece feed direction. The heating device 24 is a device that heats the steel workpiece 100 that is being fed by the feed device 22. In the following explanation, a portion of the steel workpiece 100 heated by the heating device 24 is referred to as a high temperature portion 100A.

The heating device 24 includes a heating coil 40 disposed encircling the pass-line PL. The heating coil 40 is disposed encircling the steel workpiece 100 at a separation of a predetermined distance from an outer peripheral face 100B of the steel workpiece 100.

Figure 4:
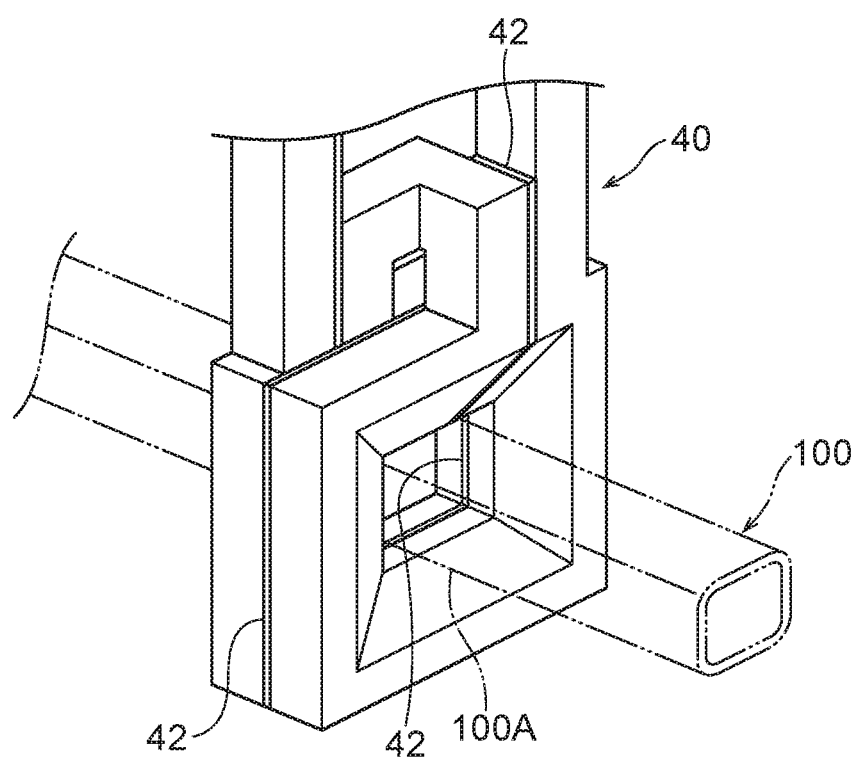
FIG. 4 is a perspective view illustrating a heating coil employed in the heat treatment apparatus illustrated in FIG. 1.
Figure 5:
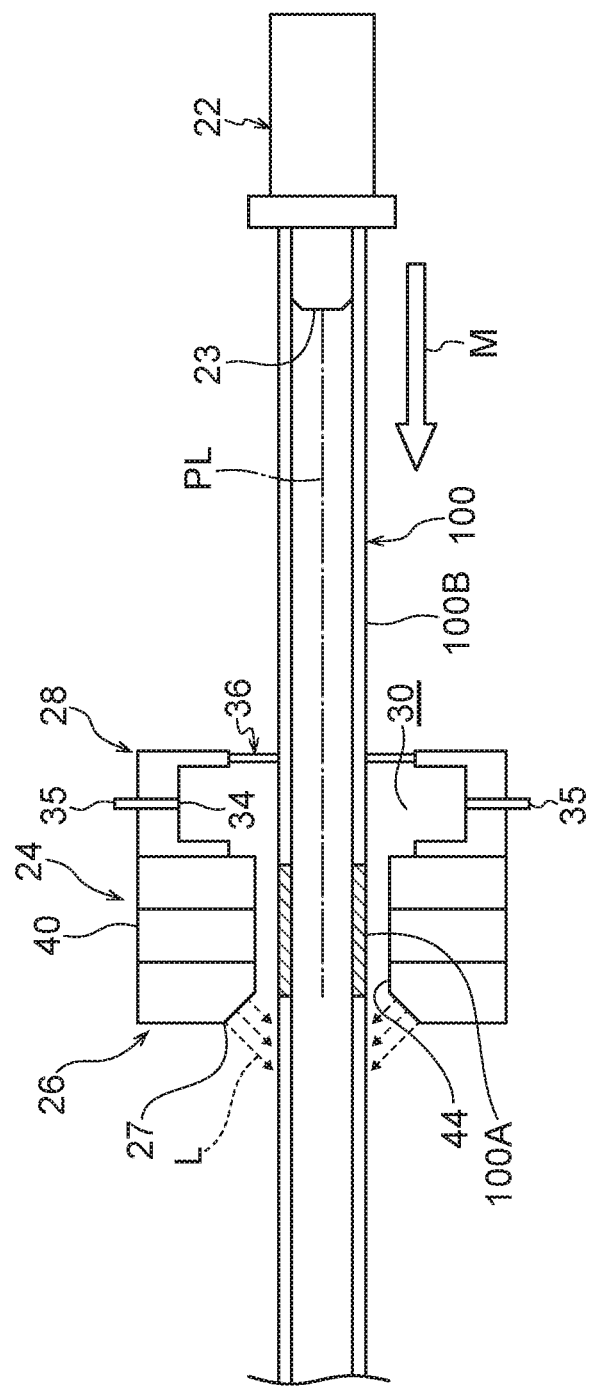
FIG. 5 is a schematic explanatory diagram illustrating relevant portions of a modified example of a heat treatment apparatus of the first exemplary embodiment.

As illustrated in FIG. 4, the heating coil 40 has two turns. A filler 42 is disposed between neighboring portions of the heating coil 40 in the steel workpiece feed direction so as to leave no gaps. The filler 42 blocks the flow of gas between the inside and the outside of the heating coil 40.

The filler 42 of the present exemplary embodiment is configured from a material with insulating properties (namely, an insulator).

Cooling Device 26

As illustrated in FIG. 1, the cooling device 26 is disposed on the pass-line PL so as to be adjacent to the heating coil 40 downstream of the heating coil 40 in the steel workpiece feed direction. The cooling device 26 is a device that rapidly cools the high temperature portion 100A by blowing a cooling medium onto the outer peripheral face 100B of the steel workpiece 100.

The cooling device 26 includes a casing 46 that is formed on the pass-line PL and includes an opening 44 through which the steel workpiece 100 is capable of passing. The cooling device 26 also includes plural spray nozzles 27 formed around the opening 44 of the casing 46 encircling the pass-line PL. The spray nozzles 27 of the cooling device 26 are disposed encircling the steel workpiece 100 at a separation of a predetermined distance from the outer peripheral face 100B of the steel workpiece 100. An example of the cooling medium from the spray nozzles 27 is cooling water L that is sprayed toward the high temperature portion 100A of the steel workpiece 100, thus rapidly cooling the high temperature portion 100A. The rapid cooling of the high temperature portion 100A of the steel workpiece 100 by the cooling device 26 quenches the high temperature portion 100A of the steel workpiece 100, forming a martensite-containing steel structure.

In the present exemplary embodiment, a filler 48 is disposed between a face 40A of the heating coil 40 (a downstream-side face in the steel workpiece feed direction) and the casing 46 of the cooling device 26 such that there are no gaps. In other words, the filler 48 completely fills the gap between the casing 46 and the face 40A of the heating coil 40. This limits gas leakage from into the heating coil 40 and inside the opening 44 of the cooling device 26. A material with insulating properties is preferably employed as the filler 48. Note that the present disclosure is not limited thereto, and, for example, configuration may be made in which the casing 46 of the cooling device 26 and the face 40A of the heating coil 40 are abutted against one another such that there are no gaps. Alternatively, the heating coil 40 may be integrated together with the casing 46 of the cooling device 26. When no gaps are present between the casing 46 of the cooling device 26 and the heating coil 40, the pressure of gas supplied to the inside of the heating coil 40 from the gas supply device 28 suppresses backflow of the cooling medium from the cooling device 26 toward the heating coil 40.

Gas Supply Device 28

As illustrated in FIG. 1, the gas supply device 28 is disposed on the pass-line PL upstream of the heating coil 40 in the steel workpiece feed direction. The gas supply device 28 is directly connected to the heating coil 40. The gas supply device 28 is disposed encircling the pass-line PL. The steel workpiece 100 is fed downstream through the gas supply device 28 in the steel workpiece feed direction. The gas supply device 28 is a device that is capable of supplying gas to the inside of the heating coil 40.

The gas supply device 28 includes a gas chamber 32 disposed encircling the pass-line PL, and plural gas compartments 30 formed within the gas chamber 32.

As illustrated in FIG. 2, the gas chamber 32 is circular cylinder shaped and is formed with ring-shaped projecting walls 32A, 32B that project toward the radial direction inside at both axial direction ends of the gas chamber 32. Note that the projecting wall 32A is positioned upstream of the projecting wall 32B in the steel workpiece feed direction. A partitioning wall 50 is formed inside the gas chamber 32. The partitioning wall 50 partitions the interior of the gas chamber 32 into the plural gas compartments 30 along the steel workpiece feed direction. The partitioning wall 50 is formed with a through hole 50A. Note that the steel workpiece 100 is fed downstream in the steel workpiece feed direction through the inside of the projecting wall 32A (referred to hereafter as the "entry port 32C" as appropriate), the through hole 50A, and the inside of the projecting wall 32B (referred to here as the "exit port 32D" as appropriate). Namely, the pass-line through the gas chamber 32 is formed by the entry port 32C, the through hole 50A, and the exit port 32D. In the present exemplary embodiment, a single partitioning wall 50 is provided inside the gas chamber 32 to form two of the gas compartments 30 inside the gas chamber 32.

The gas chamber 32 is configured by a non-metallic material such as resin or ceramic. Since the gas chamber 32 is configured from a non-metallic material, the gas chamber 32 does not generate heat despite being directly connected to the heating coil 40.

As illustrated in FIG. 2, gas G is supplied to the gas compartments 30 through gas injection ports 34, described later, from a gas supply source 52, described later. The gas G that fills the interior of the gas compartments 30 is fed to the inside of the heating coil 40 through the exit port 32D of the gas chamber 32. The periphery of the portion (high temperature portion 100A) of the steel workpiece 100 that is being heated by the heating device 24 can thus be cloaked in gas. The exit port 32D of the gas chamber 32 is directly connected to the face 40A of the heating coil 40. The gas G is thus suppressed from leaking out from between the gas chamber 32 and the heating coil 40.

The gas G supplied into the gas compartments 30 is a non-oxidizing gas. Examples of non-oxidizing gases that may be employed include inert gases (for example carbon dioxide, argon, and nitrogen). Note that from the perspectives of the safety and affordability of the gas supply device 28, nitrogen is preferably employed as the gas G.

FIG. 2 illustrates a cross-section taken orthogonally to the pass-line PL, in which the gas compartment 30 has a circular cross-section profile. Note that the present disclosure is not limited to such a configuration, and the gas compartments 30 may have elliptical cross-section profiles or polygonal cross-section profiles with six or more sides.

Moreover, as illustrated in FIG. 1, the gas supply device 28 further includes the gas injection ports 34 that supply the gas G fed from the gas supply source 52 into the gas compartments 30, and a regulator mechanism 54 that regulates the pressure of the gas supplied into each of the gas compartments 30.

Gas Injection Ports 34

Plural of the gas injection ports 34 are provided in each of the gas compartments 30. Specifically, plural gas injection ports 34 are provided in a gas compartment 30A positioned upstream in the steel workpiece feed direction, and plural gas injection ports 34 are provided in a gas compartment 30B positioned downstream in the steel workpiece feed direction.

In the present exemplary embodiment, each gas injection port 34 is configured by a tube shaped nozzle 35 that passes through a peripheral wall 32E of the gas chamber 32. A leading end of the nozzle 35 is substantially co-planar with an inner face of the peripheral wall 32E, and the gas injection port 34 is configured by an opening in the leading end. A base end of each nozzle 35 is connected to the gas supply source 52 through a gas tube.

As illustrated in FIG. 2 and FIG. 3, as viewed in cross-section taken orthogonally to the pass-line PL, an angle θ formed between a straight line SL joining a center C of the heating coil 40 and any gas injection port 34 and the direction in which gas G is injected from the gas injection port 34 (referred to hereafter as the "gas injection direction" as appropriate) is in a range of from 5° to 45°. Namely, the gas injection direction is set such that the angle θ is in a range of from 5° to 45° with respect to a direction toward the center C.

Moreover, in a single gas compartment 30, each of the plural gas injection ports 34 injects gas in the same direction with respect to a peripheral direction of the gas chamber 32. In other words, in a single gas compartment 30, the plural gas injection ports 34 are disposed facing in the same direction with respect to the peripheral direction of the gas chamber 32.

Preferably, in each gas compartment 30, each gas injection port 34 has the same angle θ.

Preferably, in each gas compartment 30, each of the gas injection ports 34 are arranged at uniform spacings around the peripheral direction of the gas chamber 32.

Moreover, the direction of each gas injection port 34 (the angle θ formed with respect to the direction toward the center C) may differ between the respective gas compartments 30, or may be the same in every gas compartment 30. Moreover, attachment positions of the respective nozzles 35 may differ between the respective gas compartments 30, or may be the same in every gas compartment 30. In the present exemplary embodiment, as illustrated in FIG. 2 and FIG. 3, the attachment positions of the respective nozzles 35 differ between the respective gas compartments 30.

Regulator Mechanism 54

The regulator mechanism 54 is disposed on the gas tubes connecting the gas supply source 52 to the gas injection ports 34. The regulator mechanism 54 includes flow rate regulator valves 56 provided at each of respective gas tubes connecting the gas supply source 52 to the gas injection ports 34. Regulating the flow rate regulator valves 56 enables the gas pressure supplied to each of the gas compartments 30 to be regulated. Note that the regulator mechanism of the present disclosure is not limited to this configuration, and, for example, configuration may be made to regulate gas pressure supplied to each of the gas compartments 30 by regulating the diameter or length of the respective gas tubes, or configuration may be made in which the respective nozzles 35 are changed to nozzles that inject at different pressures.

As illustrated in FIG. 1, the gas supply device 28 includes an elastic sealing member 36 attached to an edge of the exit port 32D (projecting wall 32A) of the gas chamber 32, and also includes an elastic sealing member 37 attached to an edge of the through hole 50A in the partitioning wall 50. The elastic sealing members 36, 37 are respectively formed with through holes 36A, 37A, through which the steel workpiece 100 passes. The shapes of the through holes 36A, 37A conform to the cross-section profile of the steel workpiece 100. The sizes of the through holes 36A, 37A are such that when the steel workpiece 100 passes through the respective through holes 36A, 37A, distances X1, X2 from hole walls 36B, 37B of the respective through holes 36A, 37A to the outer peripheral face 100B of the steel workpiece 100 (in other words, gaps between the through holes 36A, 37A and the steel workpiece 100) are either 0 mm (no gaps present), or no greater than 1 mm. The elastic sealing member 36 suppresses atmospheric oxygen from flowing into the gas compartments 30 through the entry port 32C of the gas chamber 32. The elastic sealing member 37 suppresses gas from moving from the gas compartment 30A to the gas compartment 30B.

The materials of the elastic sealing members 36, 37 are not particularly limited. However, a viscoelastic material such as rubber is preferable since it is not liable to damage the outer peripheral face 100B of the steel workpiece 100.

Next, explanation follows regarding the heat treatment method for the steel workpiece 100 of the present exemplary embodiment. Note that in the present exemplary embodiment, explanation follows regarding a method for performing heat treatment on (quenching) the steel workpiece 100 using the heat treatment apparatus 20.

Feed Process

First, the feed device 22 is used to feed the steel workpiece 100 along the pass-line PL to the gas supply device 28 positioned downstream of the feed device 22 in the steel workpiece feed direction.

Gas Supply Process

Next, the gas supply device 28 is actuated to supply a non-oxidizing gas G to each gas compartment 30, thereby filling the gas compartments 30 with the gas G The periphery of the steel workpiece 100 passing through the gas compartments 30 is thus cloaked in the gas and the steel workpiece 100 is fed to the inside of the heating coil 40 in a state cloaked in the gas G.

The pressure of the gas supplied to the gas compartments 30 through the regulator mechanism 54 is a positive pressure. This suppresses the atmosphere outside the gas chamber 32 from flowing into the gas chamber 32. Moreover, the pressure of the gas is lower in the gas compartment 30A positioned upstream in the steel workpiece feed direction than in the gas compartment 30B positioned downstream in the steel workpiece feed direction. Such a configuration suppresses any atmosphere outside the gas chamber 32 that has flowed into the gas compartment 30A from then entering the gas compartment 30B.

When this is performed, extension lines EL extended along the gas injection directions of the respective gas injection ports 34 do not intersect with the steel workpiece 100 passing through the gas compartments 30.

Heating Process

Next, the heating coil 40 of the heating device 24 heats the steel workpiece 100 cloaked by the gas G to no less than the Ac3 point.

Cooling Process

Next, the cooling device 26 applies cooling water to the high temperature portion 100A of the steel workpiece 100 heated by the heating coil 40 so as to rapidly cool the high temperature portion 100A. The high temperature portion 100A of the steel workpiece 100 is thus quenched to form a martensite-containing steel structure.

Explanation follows regarding operation and advantageous effects of the present exemplary embodiment.

In the heat treatment apparatus 20, the heating coil 40 and the gas supply device 28 are directly connected to each other. Accordingly, in comparison to a heat treatment apparatus in which a gap is present between the heating coil 40 and the gas supply device 28, for example, gas other than the gas G (for example atmospheric oxygen) can be suppressed from entering to the inside of the heating coil 40. The surface of the steel workpiece 100 is thus suppressed from oxidizing (oxidation that forms oxide scale). Moreover, since the heating coil 40 and the gas supply device 28 are directly connected to each other, atmospheric oxygen is suppressed from mixing with the gas G that cloaks the periphery of the steel workpiece 100 in the gas supply device 28. Hitherto, gas supply rates have been set on the high side in order to suppress the proportion of oxygen mixed in with the gas G that cloaks the periphery of the steel workpiece 100. However, the present exemplary embodiment enables the amount of gas supplied to be reduced. This thereby enables manufacturing costs of the steel workpiece 100 to be reduced as a result.

In the heat treatment apparatus 20, the heating coil 40 includes two turns. Gaps in the first and second turns of the coil are positioned so as to be offset from each other in the peripheral direction, thereby enabling uneven heating in the peripheral direction of the steel workpiece 100 to be suppressed. The filler 42 is disposed between neighboring portions of the heating coil 40 in the steel workpiece feed direction, such that there are no gaps. This enables the gas G to be suppressed from leaking out from into the heating coil 40, and enables gas other than the gas G to be suppressed from entering the inside of the heating coil 40.

Moreover, in the heat treatment apparatus 20, the gas injection ports 34 are provided for each of the gas compartments 30 of the gas chamber 32. Accordingly, the heat treatment apparatus 20 is more capable of suppressing atmospheric oxygen that enters through the entry port 32C of the gas chamber 32 together with the steel workpiece 100 from reaching the inside of the heating coil 40 than, for example, a configuration in which gas injection ports 34 are only provided at a single gas compartment 30. Specifically, due to the pressure difference, gas G supplied into the gas compartment 30A is discharged to the device exterior through the through hole 36A of the elastic sealing member 36. Accordingly, atmospheric oxygen is not liable to enter the gas compartment 30A from between the through hole 36A and the steel workpiece 100. The majority of the gas G supplied to the gas compartment 30B flows to the inside of the heating coil 40 due to the pressure difference, while some of the gas G flows toward the gas compartment 30A. Accordingly, atmospheric oxygen does not readily mix with the gas G cloaking the outer periphery of the steel workpiece 100 in the gas compartment 30B.

Moreover, in the heat treatment apparatus 20, plural of the gas injection ports 34 are provided in a single gas compartment 30. Accordingly, the gas G can be made to cloak the periphery of the steel workpiece 100 more easily than in a configuration in which, for example, a single gas compartment 30 is provided with a single gas injection port 34. In particular, each of the gas compartments 30 has a circular cross-section profile as taken orthogonally to the pass-line PL, and in a single gas compartment 30, the plural gas injection ports 34 all face in the same direction as each other in the peripheral direction, thereby enabling the gas G to be made to flow in a vortex centered on the steel workpiece 100 (flow toward one direction) inside the gas compartments 30. This thereby enables the gas G to be made to cloak the periphery of the steel workpiece 100 more easily.

In cross-section taken orthogonally to the pass-line PL, the angle $\theta$ formed between each straight line SL joining the center of the heating coil and a gas injection port and the gas injection direction is within a range of from 5° to 45°. It is thus easier to make the gas G flow in a vortex inside the gas compartments 30 than in a configuration in which, for example, the angle $\theta$ does not fall into the above range. The gas G can thus be made to cloak the periphery of the steel workpiece 100 more easily and for a longer time.

The extension line EL extending along the gas injection direction from each gas injection port 34 does not intersect with the steel workpiece 100 passing through the gas compartments 30. Accordingly, the injected gas G is suppressed from colliding with the steel workpiece 100 in comparison to a configuration in which, for example, the extension lines EL and the steel workpiece 100 overlap each other. This thereby enables turbulence in the flow of the gas G inside the gas compartments 30 to be suppressed.

Moreover, the gas supply device 28 includes the regulator mechanism 54 that regulates the gas pressure supplied to each gas compartment 30. The gas compartment 30A has a positive pressure, thereby suppressing the gas G from entering the gas compartment 30A from the entry port side of the gas chamber 32. Moreover, the regulator mechanism 54 configures the gas compartment 30A with a lower gas pressure than that of the gas compartment 30B, thereby reinforcing the sealing of the gas compartment 30B. The gas G is thus suppressed from flowing to the inside of the heating coil 40 from the entry port side of the gas chamber 32 via the gas compartment 30A and the gas compartment 30B.

In the heat treatment apparatus 20, the elastic sealing member 36 is attached to the edge of the entry port 32C of the gas chamber 32, thereby enabling a reduction in the amount of the gas G that flows to the exterior of the device through the gas compartment 30A in comparison to configurations in which, for example, the elastic sealing member 36 is not attached.

Attaching the elastic sealing member 37 to the edge of the through hole 50A of the partitioning wall 50 enables mixing of the gas G between the interiors of the gas compartment 30B and the gas compartment 30A to be better suppressed than in configurations in which, for example, the elastic sealing member 37 is not attached. Moreover, the amount of gas that flows out of the gas compartment 30B to the gas compartment 30A is reduced, enabling the flow of the gas G toward the heating coil 40 to be prioritized inside the gas compartment 30B.

The steel workpiece 100 heat treated using the heat treatment apparatus 20 of the present disclosure does not have a surface oxide scale, or if it does, the thickness thereof is no greater than 1 μm, and the proportion of FeO contained in such oxide scale is at least 90%, with a steel structure containing martensite.

Such oxide scale may be measured using a PBL3080, manufactured by Nihon Parkerizing Co., Ltd. When chemical conversion treatment using a processing liquid is performed for 120 seconds under standard conditions, and X-ray analysis of the surface is performed after the chemical conversion treatment, the total X-ray intensity of FeO, $Fe_3O_4$, and $Fe_2O_3$ has a ratio of no greater than 0.05 with respect to the total X-ray intensity of phosphophyllite and hopeite. Accordingly, quenched steel manufactured using a manufacturing device and manufacturing method of the present disclosure effectively suppresses the generation of thick scale, this being detrimental to coatability, and thereby enables an improved surface state and improved coatability.

Moreover, the coatability and corrosion resistance of the steel workpiece 100 can be improved thereby, enabling the corrosion resistance demanded of automotive components to be secured, and thus enabling a major contribution to be made to improving automotive quality.

Moreover, the present disclosure is capable of markedly suppressing the amount of gas used in processing, thereby enabling an improvement in the working environment.

Figure 6:
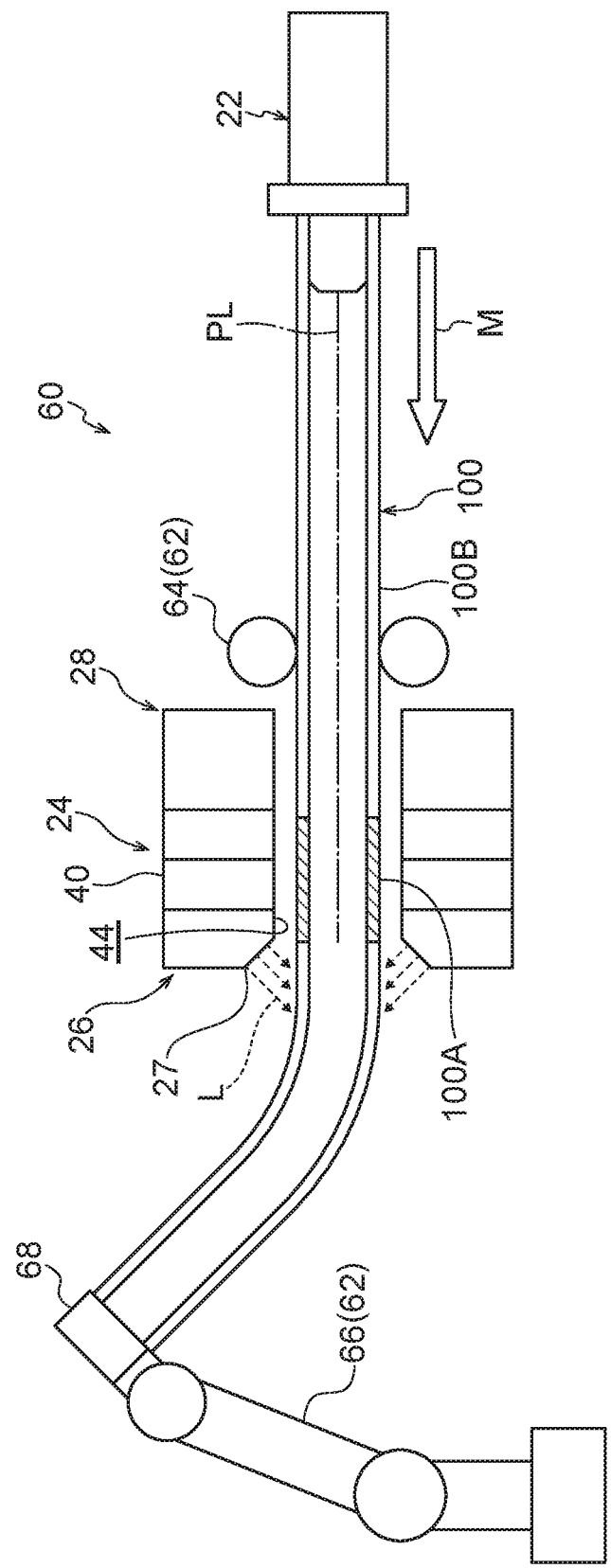
FIG. 6 is a schematic explanatory diagram illustrating relevant portions of a heat treatment apparatus of a second exemplary embodiment of the present disclosure.

Next, explanation follows regarding a heat treatment apparatus and a hot bending method for a steel workpiece in a second exemplary embodiment of the present disclosure, with reference to FIG. 6. Note that configurations similar to those of the first exemplary embodiment are allocated the same reference numerals, and explanation thereof is omitted.

Heat Treatment Apparatus 60

As illustrated in FIG. 6, a heat treatment apparatus 60 of the present exemplary embodiment includes a bending device 62 in addition to the configuration of the heat treatment apparatus 20 of the first exemplary embodiment. Note that the heat treatment apparatus 60 is what is referred to as a 3DQ device.

Bending Device 62

As illustrated in FIG. 6, the bending device 62 includes a positioning device 64 and a robot 66. The bending device 62 is a device that bents the steel workpiece 100 at the high temperature portion 100A by applying a bending moment to the steel workpiece 100 between the heating coil 40 and the cooling device 26.

The positioning device 64 is disposed upstream of the gas supply device 28 in the steel workpiece feed direction. The positioning device 64 moves the steel workpiece 100 in the steel workpiece feed direction while positioning the steel workpiece 100 at a predetermined position. Namely, the pass-line PL is defined by the positioning device 64.

The positioning device 64 is, for example, configured by dies. The dies include at least one pair of rollers that are capable of supporting the steel workpiece 100 as the steel workpiece 100 is being fed.

The robot 66 is an articulated industrial robot. The robot 66 includes a chuck 68 that holds a leading end of the steel workpiece 100.

Next, explanation follows regarding a hot bending method for the steel workpiece 100 employing the heat treatment apparatus 60 of the present exemplary embodiment. Note that with the exception of a bending process, the bending method of the steel workpiece 100 of the present exemplary embodiment is similar to the heat treatment method for the steel workpiece in the first exemplary embodiment, and so explanation thereof is omitted.

Bending Process

In the bending process, the bending device 62 is used to apply a bending moment to the steel workpiece 100 between the heating coil 40 and the cooling device 26 so as to bend-deform the steel workpiece 100. Specifically, a portion of the steel workpiece 100 between the heating coil 40 and the cooling device 26 configures the high temperature portion 100A. The high temperature portion 100A of the steel workpiece 100 is deformed (by bending deformation or shear deformation) by applying a bending moment to the high temperature portion 100A. The bent high temperature portion 100A is then rapidly cooled and hardened by the cooling device 26.

Next, explanation follows regarding operation and advantageous effects of the present exemplary embodiment. Note that explanation regarding operation and advantageous effects similar to those of the first exemplary embodiment will be omitted as appropriate.

The heat treatment apparatus 60 of the present exemplary embodiment includes the bending device 62, enabling the steel workpiece 100 to be bent into a desired shape.

Note that in the second exemplary embodiment, the bending device 62 is configured including the positioning device 64 and the robot 66. However, the present disclosure is not limited to such a configuration. For example, instead of the robot 66, the bending device 62 may be configured with movable roller dies that are disposed downstream of the cooling device 26 in the steel workpiece feed direction and that are capable of changing angle and position as desired.

In the exemplary embodiment described above, plural of the gas compartments 30 are provided inside the gas chamber 32 of the gas supply device 28 along the steel workpiece feed direction. However, the present disclosure is not limited to such a configuration. For example, configuration may be made in which only a single gas compartment 30 is provided inside the gas chamber 32 (see FIG. 3). Alternatively, three or more of the gas compartments 30 may be provided inside the gas chamber 32. When the total number of gas compartments 30 is n, the gas supply rate to an upstream gas compartment 30 in the steel workpiece feed direction is $V_1$, and the gas supply rates to subsequent gas compartments 30 heading downstream in the steel workpiece feed direction are $V_2, \ldots V_n$, the gas supply rates are preferably in the relationship $V_1 \leq V_2 \leq \ldots \leq V_n$. Such a configuration enables the total amount of gas supplied by the gas supply device 28 to be kept small, and enables oxide scale formation on the surface of the steel workpiece 100 to be effectively suppressed.

Moreover, when the total number of gas compartments 30 is n, the pressure inside the upstream gas compartment 30 in the steel workpiece feed direction is $P_1$, the pressures inside the subsequent gas compartments 30 heading downstream in the steel workpiece feed direction are $P_2, \ldots P_n$, and the external air pressure (atmospheric pressure) is $P_0$, the pressure inside each of the gas compartments 30 is preferably in the relationship $P_0 \leq P_1 \leq P_2 \leq \ldots \leq P_n$. Such a configuration enables the total amount of gas supplied by the gas supply device 28 to be kept small, and enables oxide scale formation on the surface of the steel workpiece 100 to be effectively suppressed.

In the exemplary embodiments described above, the heating coil 40 includes two turns. However, the present disclosure is limited to such a configuration. For example, the heating coil 40 may have a single turn, or the heating coil 40 may have three or more turns. However, two is the most preferable number of turns of the heating coil. There are two reasons for this. Firstly, were the number of turns of the heating coil to be increased, the length of the high temperature portion 100A would become longer, reducing bending precision. Secondly, were the heating coil to have only a single turn, uneven heating would become unavoidable due to a gap in the coil in the peripheral direction.

Moreover, in the exemplary embodiments described above, the gas injection ports 34 are provided in each of the gas compartments 30. However, the present disclosure is not limited to such a configuration. For example, configuration may be made in which, out of plural gas compartments 30, gas injection ports 34 are provided in at least a gas compartment 30 at a downstream position in the steel workpiece feed direction. By providing gas injection ports 34 to the gas compartment 30B positioned downstream in the steel workpiece feed direction, gas G flows from the gas compartment 30B to the gas compartment 30A, enabling atmospheric oxygen to be more effectively suppressed from entering the inside of the heating coil 40 than in cases in which gas injection ports 34 are provided in a gas compartment 30A positioned upstream in the steel workpiece feed direction.

EXAMPLES

Explanation follows regarding examples of the present disclosure. The present disclosure is not limited by these examples.

A heat treatment apparatus including a feed device, a heating device, a cooling device, and a gas supply device was employed to quench steel workpieces, varying the respective conditions of: number of gas compartments in a gas chamber; gap between gas chamber entry port and steel workpiece; gas ejection angle of non-oxidizing gas; gas supply rate to each gas compartment; and pressure inside each gas compartment. These conditions are set out in Table 1. The formation of oxide scale on each quenched steel workpiece was evaluated using evaluation criteria, discussed later (Examples 1 to 8, Comparative Examples 1, 2).

Note that the gas chamber entry port mentioned above refers to an opening on the steel workpiece feed direction upstream side of the gas chamber entry port configuring the gas supply device (through hole in the elastic sealing member). In these Examples, the gas supply device employed includes an elastic sealing member to reduce the gap between the entry port and the steel workpiece.

Steel tubes having a width of 36 mm, a height of 42 mm, a material thickness of 2.4 mm, and a rectangular cross-section profile were employed as the steel workpieces.

Each steel tube was fed at a speed of 20 mm/sec by the feed device. The heating temperature of the steel tube by the heating device was 1000° C. Cooling water was sprayed on each steel tube from the cooling device at a rate of 100 L/min, and the temperature of the cooling water was 17° C. $N_2$ was employed as the non-oxidizing gas supplied by the gas supply device.

In Comparative Example 1, no gas supply device was used to prevent oxide scale formation. A quenched steel workpiece was manufactured without supplying non-oxidizing gas, and evaluated using similar criteria. All other conditions were the same as those for Examples 1 to 8.

In Comparative Example 2, no gas supply device was used, and non-oxidizing gas was ejected directly onto the high temperature portion of the steel workpiece through gas supply nozzles. The steel workpiece was quenched in this manner and evaluated using similar criteria. All other conditions were the same as those for Examples 1 to 8.

Evaluation Criteria

A: No formation of oxide scale that peels easily from the surface of the steel workpiece.

B: Oxide scale that peels easily from the steel workpiece surface was formed over part of the surface, in a region making up more than 10% of the total heated region of the steel workpiece surface (checked by applying adhesive tape to the steel workpiece surface and then peeling off the adhesive tape).

C: Oxide scale that peels easily from the steel workpiece surface or oxide scale that peeled off during processing was formed over part of the surface.

D: Oxide scale that peels easily from the steel workpiece surface was formed over the entire surface (includes cases in which some peeled off during processing).

Results were as set out in Table 1.

TABLE 1

| | Number of coil turns | Number of gas compartments | Gap between gas chamber entry port and steel workpiece (mm) | Gas injection angle θ (°) | Gas supply rate (L/min) | Internal pressure of gas compartments | Result |
|---|---|---|---|---|---|---|---|
| Example 1 | 2 | 2 | 0.5 | 20 | $V_1 = V_2 = 125$ | $P_0 < P_1 = P_2$ | A |
| Example 2 | 2 | 2 | 0 | 20 | $V_1 = V_2 = 125$ | $P_0 < P_1 = P_2$ | A |
| Example 3 | 2 | 2 | 0.5 | 20 | $V_1 = 100$, $V_2 = 150$ | $P_0 < P_1 < P_2$ | A |
| Example 4 | 2 | 2 | 1.5 | 20 | $V_1 = V_2 = 125$ | $P_0 < P_1 = P_2$ | B |
| Example 5 | 2 | 2 | No elastic sealing member | 20 | $V_1 = V_2 = 125$ | $P_0 < P_1 = P_2$ | B |

TABLE 1-continued

|  | Number of coil turns | Number of gas compartments | Gap between gas chamber entry port and steel workpiece (mm) | Gas injection angle θ (°) | Gas supply rate (L/min) | Internal pressure of gas compartments | Result |
|---|---|---|---|---|---|---|---|
| Example 6 | 2 | 2 | 0.5 | 20 | $V_1 = 150$, $V_2 = 100$ | $P_0 < P_1 < P_2$ | B |
| Example 7 | 2 | 1 | 0.5 | 20 | $V_1 = 250$ | $P_0 < P_1$ | C |
| Example 8 | 2 | 2 | 0.5 | 0 | $V_1 = V_2 = 125$ | $P_0 < P_1 = P_2$ | C |
| Comparative Example 1 | 2 | | No gas compartments | | | | D |
| Comparative Example 2 | 2 | Gas ejected directly onto high temperature portion by gas supply nozzles | | | 250 | | D |

The present disclosure was confirmed to be capable of effectively suppressing oxide scale formation on the steel workpiece surface.

Moreover, setting the gap at the upstream opening of the gas chamber in the steel workpiece feed direction to 0 mm (no gap), or in a range of no greater than 1 mm, was confirmed to obtain even greater advantageous effects.

It was also confirmed that the advantageous effects are enhanced when the gas supply rates satisfy the relationship $V_1 \leq V_2 \leq \ldots \leq V_n$, where the gas supply rates are regulated such that the gas supply rate to each gas compartment is $V_1$, and the gas supply rates to subsequent gas compartments heading downstream in the steel workpiece feed direction is $V_2, \ldots V_n$.

The following supplements are also disclosed in relation to the exemplary embodiments described above.

Supplement 1

A heat treatment apparatus including:

a feed device that feeds a heat treatment workpiece downstream in a feed direction along a heat treatment workpiece pass-line;

a heating device that includes a heating coil disposed downstream of the feed device in the feed direction and encircling the pass-line;

a cooling device that is disposed adjacent to the heating coil, downstream of the heating coil in the feed direction, and encircling the pass-line; and a gas supply device that is disposed upstream of the heating coil in the feed direction, directly connected to the heating coil and encircling the pass-line, and that includes a plurality of gas compartments configured by internally partitioning the gas supply device in the feed direction.

Supplement 2

The automotive component manufacturing method of supplement 1, wherein the heating coil includes two turns, and a filler is disposed between neighboring portions of the heating coil in the feed direction such that there are no gaps between the neighboring portions.

Supplement 3

A heat treatment apparatus including: a feed device that feeds a heat treatment workpiece downstream in a feed direction along a heat treatment workpiece pass-line;

a heating device that includes a two-turn heating coil disposed downstream of the feed device in the feed direction, encircling the pass-line, with a filler disposed between neighboring portions of the heating coil in the feed direction such that there are no gaps between the neighboring portions;

a cooling device that is disposed adjacent to the heating coil, downstream of the heating coil in the feed direction, and encircling the pass-line; and a gas supply device that is disposed upstream of the heating coil in the feed direction, directly connected to the heating coil and encircling the pass-line.

Supplement 4

The automotive component manufacturing method of supplement 3, wherein the heating device includes a plurality of gas compartments configured by internally partitioning the heating device in the feed direction.

Supplement 5

The heat treatment apparatus of any one of supplement 1, supplement 2, or supplement 4, further including a gas injection port inside at least the gas compartment positioned furthest downstream in the feed direction in the gas supply device.

Supplement 6

The heat treatment apparatus of supplement 5, wherein the gas supply device includes a gas injection port inside each of the gas compartments.

Supplement 7

The heat treatment apparatus of either supplement 5 or supplement 6, wherein a plurality of the gas injection ports are provided in a single gas compartment of the gas compartments.

Supplement 8

The heat treatment apparatus of supplement 7, wherein: the gas compartments have a circular profile, an elliptical profile, or a polygonal profile with six or more sides in a cross-section orthogonal to the pass-line; and inside the single gas compartment, gas injection directions of the plurality of gas injection ports each face the same way along a peripheral direction.

Supplement 9

The heat treatment apparatus of supplement 8, wherein, in a cross-section orthogonal to the pass-line, an angle formed between a straight line joining a center of the heating coil to the gas injection ports, and the gas injection direction, is within a range of from 5° to 45°.

Supplement 10

The heat treatment apparatus of any one of supplement 7 to supplement 9, wherein the gas supply device further includes a regulator mechanism that regulates a pressure of gas supplied to each of the gas compartments.

Supplement 11

The heat treatment apparatus of any one of supplement 1 to supplement 10, further including an elastic sealing member that is provided at an edge of an opening encircling the pass-line, the opening being provided in a feed direction upstream wall of the gas supply device.

Supplement 12

The heat treatment apparatus of any one of supplement 1, supplement 2, or supplements 4 to 10, further including an elastic sealing member that is provided at an edge of an opening encircling the pass-line, the opening being provided in a wall dividing the plurality of gas compartments of the gas supply device.

Supplement 13

The heat treatment apparatus of any one of supplement 1 to supplement 12, further including a bending device that applies a bending moment to the heat treatment workpiece between the heating coil and the cooling device.

Supplement 14

A heat treatment method for a steel workpiece as the heat treatment workpiece when the heat treatment apparatus of any one of supplement 1 to supplement 13 is employed, the heat treatment method including:

feeding the steel workpiece into the heating coil in a state in which a non-oxidizing gas is supplied into the gas compartments of the gas supply device such that the gas cloaks a periphery of the steel workpiece passing through the gas compartments;

heating the steel workpiece with the heating device; and cooling the heated steel workpiece with the cooling device.

Supplement 15

A heat treatment method for a steel workpiece as the heat treatment workpiece when the heat treatment apparatus of any one of supplement 7 to supplement 10 is employed, the heat treatment method including:

feeding the steel workpiece into the heating coil in a state in which a non-oxidizing gas is supplied into any of the gas compartments of the gas supply device such that the gas compartment positioned furthest upstream in the steel workpiece feed direction has positive pressure, and such that the gas cloaks a periphery of the steel workpiece passing through the gas compartments;

heating the steel workpiece with the heating device; and cooling the heated steel workpiece with the cooling device.

Supplement 16

The steel workpiece heat treatment method of supplement 15, a pressure of the gas supplied to one of the gas compartments that positioned further upstream in the steel workpiece feed direction is lower than a pressure of the gas supplied to another of the gas compartments that positioned downstream thereof in the steel workpiece feed direction.

Supplement 17

The steel workpiece heat treatment method of supplement 16, wherein an extension line extended along an injection direction of the gas from the gas injection ports does not intersect with the steel workpiece passing through the gas compartments.

Supplement 18

A hot bending method for a steel workpiece as the heat treatment workpiece when the heat treatment apparatus of supplement 13 is employed, hot bending method including:

feeding the steel workpiece into the heating coil in a state in which a non-oxidizing gas is supplied into the gas compartments of the gas supply device such that the gas cloaks the periphery of the steel workpiece passing through the gas compartments;

heating the steel workpiece with the heating device;

cooling the heated steel workpiece with the cooling device; and bend-deforming the heat treatment workpiece by applying a bending moment to the heat treatment workpiece between the heating coil and the cooling device, with the bending device.

Supplement 19

A quenched steel workpiece manufacturing device including:

a feed device to feed a steel workpiece in a length direction of the steel workpiece;

a heating device that is disposed at a first position spaced apart from the steel workpiece that is being fed, and that heats the steel workpiece to a temperature region in which quenching is possible;

a cooling device that is disposed at a second position downstream of the first position in a feed direction of the steel workpiece, and that blows a cooling medium onto the steel workpiece in order to quench the steel workpiece; and a scale-preventing gas supply device that is disposed at a third position upstream of the first position in the feed direction of the steel workpiece encircling the periphery of the steel workpiece, wherein the scale-preventing gas supply device includes a non-oxidizing gas chamber configured from at least two gas compartments, the non-oxidizing gas chamber including at least two non-oxidizing gas supply paths that supply non-oxidizing gas into the at least two gas compartments and including at least two non-oxidizing gas ejection holes that eject non-oxidizing gas into the at least two gas compartments, the at least two non-oxidizing gas supply paths and the at least two non-oxidizing gas injection holes being provided so as to eject non-oxidizing gas directed in the same direction in each of the at least two gas compartments and at an angle such that an ejection angle of the non-oxidizing gas from each non-oxidizing gas ejection hole is inclined by from 5° to 45° with respect to an angle from a center of the non-oxidizing gas ejection hole to a center of the non-oxidizing gas chamber in cross-section orthogonal to the steel workpiece, the at least two non-oxidizing gas ejection holes being provided along a peripheral direction of the non-oxidizing gas chamber, and having a function of filling a space at the periphery of a portion of the steel workpiece heated by the heating device with non-oxidizing gas.

Supplement 20

The quenched steel workpiece manufacturing device of supplement 19, wherein the scale-preventing gas supply device includes a seal that blocks a feed direction upstream opening of the non-oxidizing gas chamber in a manner that allows entry of the steel workpiece, a gap between the seal and the steel workpiece being set in a range of from 0 mm to 1 mm.

Supplement 21

The quenched steel workpiece manufacturing device of either supplement 19 or supplement 20, wherein the non-oxidizing gas ejection holes are attached so as to be oriented in a direction that is not oriented toward a heated portion of the steel workpiece heated by the heating device.

Supplement 22

The quenched steel workpiece manufacturing device of any one of supplement 19 to supplement 21, wherein the non-oxidizing gas is an inert gas or a reduced gas.

Supplement 23

The quenched steel workpiece manufacturing device of any one of supplement 19 to supplement 22, wherein the steel workpiece is a hollow member with a closed lateral cross-section profile.

Supplement 24

The quenched steel workpiece manufacturing device of any one of supplement 19 to supplement 22, wherein gas supply rates satisfy the relationship $V_1 \leq V_2 \leq \ldots \leq V_n$, n being the total number of the gas compartments, $V_1$ being a gas supply rate to an upstream gas compartment in the feed direction, and $V_2, \ldots V_n$ being gas supply rates to subsequent gas compartments on progression downstream.

Supplement 25

The quenched steel workpiece manufacturing device of any one of supplement 19 to supplement 24, wherein pressures inside each of the gas compartments satisfy the relationship $P_0 \leq P_1 \leq P_2 \leq \ldots \leq P_n$, n being the total number of the gas compartments, $P_1$ being the pressure inside an upstream gas compartment in the feed direction, $P_2, \ldots P_0$ being the pressure inside subsequent gas compartments on progression downstream, and $P_0$ being an external air pressure (atmospheric pressure).

Supplement 26

A quenched steel workpiece manufacturing method in which, while feeding a steel workpiece in a length direction of the steel workpiece, the steel workpiece is heated to a temperature region in which quenching is possible by a heating device disposed at a first position spaced apart from the steel workpiece, and the steel workpiece is quenched by blowing the steel workpiece with a cooling medium by a cooling device disposed at a second position downstream of the first position in a feed direction of the steel workpiece, the manufacturing method including using a scale-preventing gas supply device that is disposed at a third position upstream of the first position in the feed direction of the steel workpiece encircling the periphery of the steel workpiece and that includes a non-oxidizing gas chamber configured from at least two gas compartments to fill a space at the periphery of a portion of the steel workpiece heated by the heating device with non-oxidizing gas by ejecting the non-oxidizing gas from at least two non-oxidizing gas ejection holes provided at the at least two gas compartments in a peripheral direction of the gas chamber such that an ejection angle of the non-oxidizing gas from each non-oxidizing gas ejection holes is inclined by from 5° to 45° with respect to an angle from a center of the non-oxidizing gas ejection hole to a center of the non-oxidizing gas chamber in a cross-section orthogonal to the steel workpiece and such that ejection directions of the non-oxidizing gas ejection holes are the same direction as each other.

Supplement 27

The quenched steel workpiece manufacturing method of supplement 26, wherein a feed direction upstream opening of the at least two gas compartments is blocked by a seal in a manner that allows entry of the steel workpiece and such that a gap between the seal and the steel workpiece is in a range of from 0 mm to 1 mm.

Supplement 28

The quenched steel workpiece manufacturing method of either supplement 26 or supplement 27, wherein the non-oxidizing gas is not directly ejected toward a heated portion of the steel workpiece heated by the heating device.

Supplement 29

The quenched steel workpiece manufacturing method of any one of supplement 26 to supplement 28, wherein the non-oxidizing gas is an inert gas or a reduced gas.

Supplement 30

The quenched steel workpiece manufacturing method of any one of supplement 26 to supplement 29, wherein the steel workpiece is a hollow member with a closed lateral cross-section profile.

Supplement 31

The quenched steel workpiece manufacturing method of any one of supplement 26 to supplement 30, wherein gas supply rates satisfy the relationship $V_1 \leq V_2 \leq \ldots \leq V_n$, n being the total number of the gas compartments, $V_1$ being a gas supply rate to an upstream gas compartment in the feed direction, and $V_2, \ldots V_n$, being gas supply rates to subsequent gas compartments on progression downstream.

Supplement 32

The quenched steel workpiece manufacturing method of any one of supplement 26 to supplement 31, wherein pressures inside each of the gas compartments satisfy the relationship $P_0 \leq P_1 \leq P_2 \leq \ldots \leq P_n$, n being the total number of the gas compartments, $P_1$ being the pressure inside an upstream gas compartment in the feed direction, $P_2, \ldots P_n$, being the pressure inside subsequent gas compartments on progression downstream, and $P_0$ being an external air pressure (atmospheric pressure).

When quenching a steel workpiece with a 3DQ device applied with supplement 19 to supplement 32, oxide scale can be effectively suppressed from forming on the steel workpiece surface while keeping the required amount of non-oxidizing gas as small as possible, thereby enabling the surface state and coatability of the quenched steel workpiece to be improved.

Moreover, the corrosion resistance demanded for application to automotive components can be secured in the manufactured quenched steel workpiece, thus enabling a major contribution to be made to improving automotive quality.

Moreover, the amount of non-oxidizing gas supply needed to achieve an equivalent effect can be suppressed, thereby enabling an improvement in the working environment.

The disclosure of Japanese Patent Application No. 2016-070015, filed on Mar. 31, 2016, is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:
1. A heat treatment apparatus, comprising:
 a feed device that feeds a heat treatment workpiece downstream in a feed direction along a heat treatment workpiece pass-line;
 a heating device that includes a heating coil disposed downstream of the feed device in the feed direction and encircling the pass-line;
 a cooling device that is disposed adjacent to the heating coil in a state in which there is no gap with respect to the heating coil, downstream of the heating coil in the feed direction, and encircling the pass-line;
 a gas supply device that is disposed upstream of the heating coil in the feed direction, directly connected to the heating coil and encircling the pass-line, and that includes a plurality of gas compartments configured by internally partitioning, via a partitioning wall, the gas supply device in the feed direction; and
 an elastic sealing member that is provided at an edge of an opening encircling the pass line, the opening being provided in a feed direction upstream wall of the gas supply device.

2. The heat treatment apparatus of claim 1, wherein the heating coil includes two turns, and a filler is disposed between neighboring portions of the heating coil in the feed direction such that there are no gaps between the neighboring portions.

3. The heat treatment apparatus of claim 1, further comprising a gas injection port inside at least the gas compartment positioned furthest downstream in the feed direction in the gas supply device.

4. The heat treatment apparatus of claim 3, wherein the gas supply device includes a gas injection port inside each of the gas compartments.

5. The heat treatment apparatus of claim 3, wherein a plurality of the gas injection ports are provided in a single gas compartment of the gas compartments.

6. The heat treatment apparatus of claim 5, wherein:
the gas compartments have a circular profile, an elliptical profile, or a polygonal profile with six or more sides in a cross-section orthogonal to the pass-line; and
inside the single gas compartment, gas injection directions of the plurality of gas injection ports each face the same way along a peripheral direction.

7. The heat treatment apparatus of claim 6, wherein, in a cross-section orthogonal to the pass-line, an angle formed between a straight line joining a center of the heating coil to the gas injection ports, and the gas injection direction, is within a range of from 5° to 45°.

8. The heat treatment apparatus of claim 5, wherein the gas supply device further includes a regulator mechanism that regulates a pressure of gas supplied to each of the gas compartments.

9. A heat treatment apparatus, comprising:
a feed device that feeds a heat treatment workpiece downstream in a feed direction along a heat treatment workpiece pass-line;
a heating device that includes a two-turn heating coil disposed downstream of the feed device in the feed direction, encircling the pass-line, with a filler disposed between neighboring portions of the heating coil in the feed direction such that there are no gaps between the neighboring portions;
a cooling device that is disposed adjacent to the heating coil in a state in which there is no gap with respect to the heating coil, downstream of the heating coil in the feed direction, and encircling the pass-line;
a gas supply device that is disposed upstream of the heating coil in the feed direction, directly connected to the heating coil and encircling the pass-line; and
an elastic sealing member that is provided at an edge of an opening encircling the pass-line, the opening being provided in a feed direction upstream wall of the gas supply device.

10. A heat treatment apparatus, comprising:
a feed device that feeds a heat treatment workpiece downstream in a feed direction along a heat treatment workpiece pass-line;
a heating device that includes a heating coil disposed downstream of the feed device in the feed direction and encircling the pass-line;
a cooling device that is disposed adjacent to the heating coil in a state in which there is no gap with respect to the heating coil, downstream of the heating coil in the feed direction, and encircling the pass-line;
a gas supply device that is disposed upstream of the heating coil in the feed direction, directly connected to the heating coil and encircling the pass-line, and that includes a plurality of gas compartments configured by internally partitioning, via a partitioning wall, the gas supply device in the feed direction; and
an elastic sealing member that is provided at an edge of an opening encircling the pass-line, the opening being provided in a wall dividing the plurality of gas compartments of the gas supply device.

11. The heat treatment apparatus of claim 1, further comprising a bending device that applies a bending moment to the heat treatment workpiece between the heating coil and the cooling device.

* * * * *